(12) United States Patent
Le Gros et al.

(10) Patent No.: US 12,717,158 B2
(45) Date of Patent: Aug. 25, 2026

(54) LIGHT-FIELD PROJECTOR HAVING A SMALL FORM FACTOR

(71) Applicant: Creal SA, Ecublens VD (CH)

(72) Inventors: Christophe Le Gros, Lausanne (CH); Tomas Sluka, Lausanne (CH); Grégoire Smolik, Chavannes-près-Renens (CH); Jonathan Masson, Puidoux (CH)

(73) Assignee: Creal SA, Ecublens VD (CH)

( * ) Notice: Subject to any disclaimer, the term of this patent is extended or adjusted under 35 U.S.C. 154(b) by 311 days.

(21) Appl. No.: 18/563,893

(22) PCT Filed: Jun. 3, 2021

(86) PCT No.: PCT/IB2021/054869
§ 371 (c)(1),
(2) Date: Nov. 23, 2023

(87) PCT Pub. No.: WO2022/254243
PCT Pub. Date: Dec. 8, 2022

(65) Prior Publication Data

US 2024/0231121 A1 Jul. 11, 2024

(51) Int. Cl.
*G02B 30/10* (2020.01)

(52) U.S. Cl.
CPC .................................... *G02B 30/10* (2020.01)

(58) Field of Classification Search
CPC ...... G02B 30/10; G02B 27/286; G02B 30/33; G02B 27/0081; G02B 27/0172;
(Continued)

(56) References Cited

U.S. PATENT DOCUMENTS 10,477,197 B2 11/2019 Bruder et al.
10,775,633 B1 9/2020 Lee et al.
(Continued)

FOREIGN PATENT DOCUMENTS

CN 112882248 A 6/2021
JP 2017513067 A 5/2017
(Continued)

OTHER PUBLICATIONS

Notice of Receipt of Office Action issued in Japanese Patent Application No. 2023-574210, mailed Mar. 6, 2025, 1 page.
(Continued)

*Primary Examiner* — Mariam Qureshi
(74) *Attorney, Agent, or Firm* — BLANK ROME LLP

(57) ABSTRACT

Light-field projector for projecting an image, the light-field projector comprising a light device (1) comprising at least one light source (10-12) sequentially generating an incident light-beam (101, 102); a collimating element (20) configured to collimate the incident light-beam (101, 102); and an optical light modulator (3) having a modulator surface area and configured to modulate the collimated incident light-beam (101, 102) and to project a modulated light-beam (201, 202). The light-field projector further comprises an optical waveguide module (30) comprising a waveguide (303) including an input grating (301) configured to couple the collimated incident light-beam (101, 102) to the waveguide (303), and an exit grating (302) configured to outcouple the collimated incident light-beam (101, 102) from the waveguide (303) and generate a plurality of expanded light-beams (201, 202); the plurality of expanded light-beam (201, 202) sequentially illuminating substantially the whole modulator surface area.

14 Claims, 7 Drawing Sheets

(58) Field of Classification Search
CPC .... G02B 2027/0125; G02B 2027/0134; H04N 9/3164; H04N 9/3167
See application file for complete search history.

(56) References Cited

U.S. PATENT DOCUMENTS

| | | | | |
|---|---|---|---|---|
| 11,435,572 | B2 | 9/2022 | Yeoh et al. | |
| 12,124,052 | B2 | 10/2024 | Trisnadi et al. | |
| 2014/0016051 | A1* | 1/2014 | Kroll | G03H 1/02 359/15 |
| 2016/0147003 | A1 | 5/2016 | Morozov et al. | |
| 2017/0016051 | A1 | 1/2017 | Chan et al. | |
| 2017/0248747 | A1* | 8/2017 | Kim | G02B 6/0068 |
| 2018/0120559 | A1* | 5/2018 | Yeoh | G02B 5/18 |
| 2018/0364486 | A1 | 12/2018 | Ding et al. | |
| 2020/0150587 | A1 | 5/2020 | Choi et al. | |

FOREIGN PATENT DOCUMENTS

| | | | |
|---|---|---|---|
| JP | 2019534478 | A | 11/2019 |
| WO | 2020047150 | A1 | 3/2020 |

OTHER PUBLICATIONS

B.C. Kress et al., "Waveguide Combiners for Mixed Reality Head-sets: A Nanophotonics Design Perspective." Nanophotonics, vol. 10, No. 1, pp. 41-74, 2021.

J. An et al., "Slim-Panel Holographic Video Display." Nature Communications, vol. 11, No. 1, pp. 1-7, 2020.

K. Yin et al., "Polarization vol. Gratings for Near-Eye Displays and Novel Photonic Devices." Crystals, vol. 10, pp. 561 (1-18), 2020.

M.J.R. Heck, "Highly Integrated Optical Phased Arrays: Photonic Integrated Circuits for Optical Beam Shaping and Beam Steering." Nanophotonics, vol. 6, No. 1, pp. 93-107, 2017.

International Search Report and Written Opinion for PCT/IB2021/054869 mailed Feb. 25, 2022, 13 pages.

* cited by examiner

LIGHT-FIELD PROJECTOR HAVING A SMALL FORM FACTOR

RELATED APPLICATIONS

This application is a national phase of PCT/IB2021/054869, filed on Jun. 3, 2021. The contents of this application are hereby incorporated by reference in its entirety.

TECHNICAL DOMAIN

The present disclosure concerns a light-field projector for projecting an image. More particularly, the disclosure concerns a light-field projector having a small form factor. The present disclosure further concerns a light-field projector for near-eye light-field projection applications in the domain of virtual/augmented/mixed reality glasses and applications.

RELATED ART

FIG. 1 shows a conventional light-field projector comprising a light device 1 provided with a plurality of light sources (two light sources 11 and 12 are shown in FIG. 1) that are collimated with collimating optics 2 into respectively collimated beams 101, 102. The collimated beams 101, 102 sequentially illuminate a spatial light modulator (SLM) 3 under a different set of incident angles. Each reflected (or transmitted) beam will carry out a certain image information, produced by the modulation of the SLM 3. Intermediate optics 4, possibly comprising combiner optics 5, re-images the initial light sources into viewpoints 21, 22. The viewpoints 21, 22 form a light field eye-box 6, allowing a user to see an authentic 3D rendering of a digital scene.

A conventional light-field projector uses arrays of spatially disparate light-sources to illuminate the SLM, each with a different orientation of a wave vector, in order to form the viewpoints 21, 22.

The large array of spatially disparate light-sources does not allow for the construction of a small form-factor cost-efficient light-field projector.

SUMMARY

The present disclosure concerns a light-field projector for projecting an image, the light-field projector comprising a light device comprising at least one light source sequentially generating an incident light-beam; a collimating element configured to collimate the incident light-beam; and an optical light modulator having a modulator surface area and configured to modulate the collimated incident light-beam and to project a modulated light-beam. The light-field projector further comprises an optical waveguide module comprising a waveguide including an input grating configured to couple the collimated incident light-beam to the waveguide, and an exit grating configured to outcouple the collimated incident light-beam from the waveguide and generate a plurality of expanded light-beams. The plurality of expanded light-beam sequentially illuminates substantially the whole modulator surface area.

The light-field projector disclosed herein can use a light device having a smaller footprint and collimated incident light-beam having a smaller size than what is used in a conventional light-field projector. The light device can further comprise fewer light sources. The light-field projector can thus have a smaller form factor, lower power consumption, and lower manufacturing complexity and cost. These and other advantages will be apparent from the disclosure contained herein.

SHORT DESCRIPTION OF THE DRAWINGS

Exemplar embodiments of the invention are disclosed in the description and illustrated by the drawings in which.

EXAMPLES OF EMBODIMENTS

Figure 2:
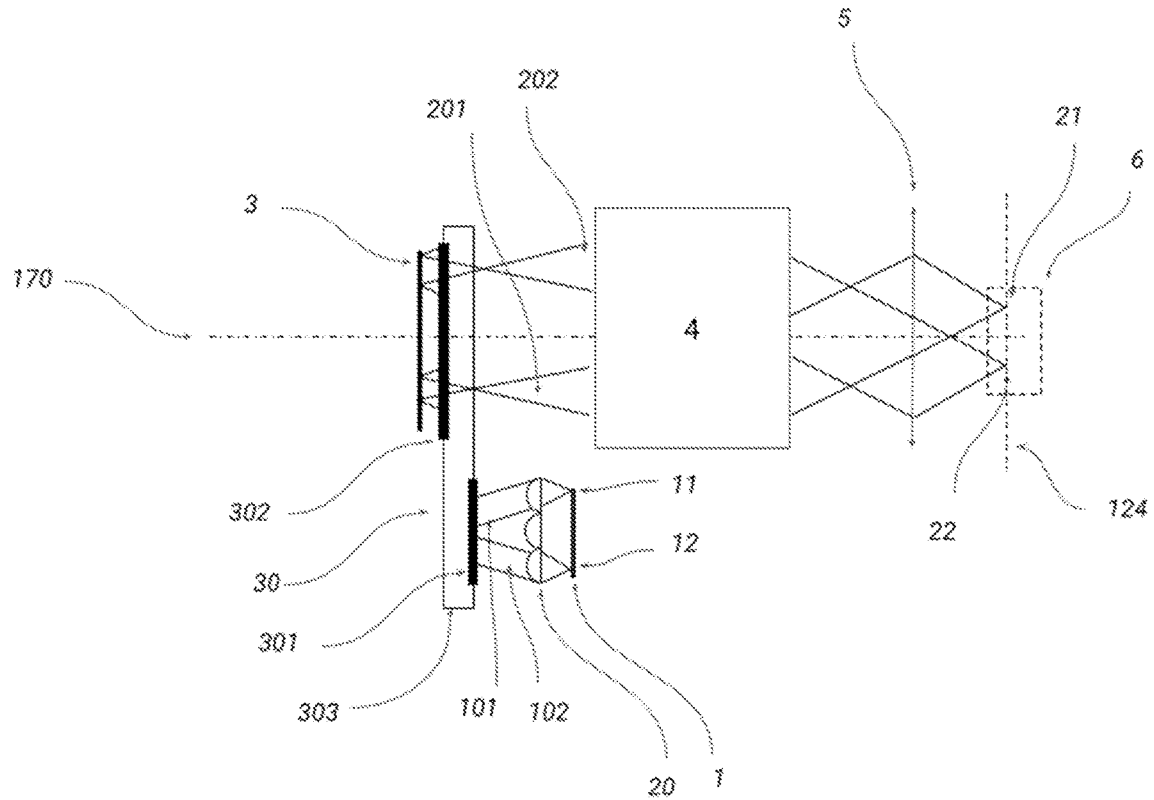
FIG. 2 shows an illumination system comprising a light device and a waveguide module, according to an embodiment.

FIG. 2 shows an illumination system according to an embodiment. The light-field projector comprises a light device 1 comprising one or a plurality of light sources, each light source sequentially generating an incident light-beam, and a collimating element 20 configured to collimate the incident light-beam 101, 102. In the example of FIG. 2, two light sources 11, 12 and incident two light-beams 101, 102 are represented.

The light-field projector further comprises a SLM 3 configured to modulate the collimated incident light-beam 101, 102 and to project a modulated light-beam 201, 202. The SLM 3 has a modulator surface area.

The light-field projector further comprises an optical waveguide module 30 comprising an input grating 301, a waveguide 303 and an exit grating 302. The input grating 301 is configured to couple the collimated incident light-beam 101, 102 into the waveguide 303. The exit grating 302 outcouple the collimated incident light-beam 101, 102 from the waveguide 303 and generate a plurality of expanded light-beams 201, 202. The plurality of expanded light-beam 201, 202 sequentially illuminates substantially the whole modulator surface area.

FIG. 2 represents the light device 1 comprising two light sources 11, 12. However, the light device 1 can comprise one or more than two light sources. For example, the light device 1 can comprise one light source or an array comprising a plurality of light sources (not shown). As explained with the help of FIG. 8 below, the surface area of the light device 1 of the light-field projector in the configuration of FIG. 2 can be smaller than the surface area of a light device of a conventional-field projector.

The collimating element 20 collimating the incident light-beam 101, 102 can comprise a single optical element (lens) or an array of two or more lenses. In the case the light device 1 comprises an array comprising a plurality of light sources 11, 12, the collimating element 20 can comprise an array of microlenses, where each light source of the array is collimated by a microlens of the array of microlenses. More generally, the collimating element 20 can comprise any one or a plurality of a lens, a mirror, a hologram, or any other optical element performing the collimation.

As shown in FIG. 2, the light-field projector can further comprise intermediate optics 4 configured to project the plurality of expanded and modulated light-beams 201, 202 modulated by the SLM 3, along a projection axis 170 such as to re-image the incident light-beam 101, 102 into viewpoints within an eye-box region 6 in an eye-box plane 124. The light-field projector allows a viewer (when the viewer's eye is located within the eye-box) to see an authentic 3D rendering of a digital scene. In FIG. 2, two viewpoints 21 and 22 are shown, corresponding to two incident light-beams 101, 102.

In a desired configuration, the optical waveguide module 30 is between the optical light modulator 3 and the intermediate optics 4. In such configuration, the plurality of expanded light-beams 201, 202 outcoupled from the exit grating 302 are modulated by the SLM 3 and reflected toward the eye-box region 6.

Figure 1:
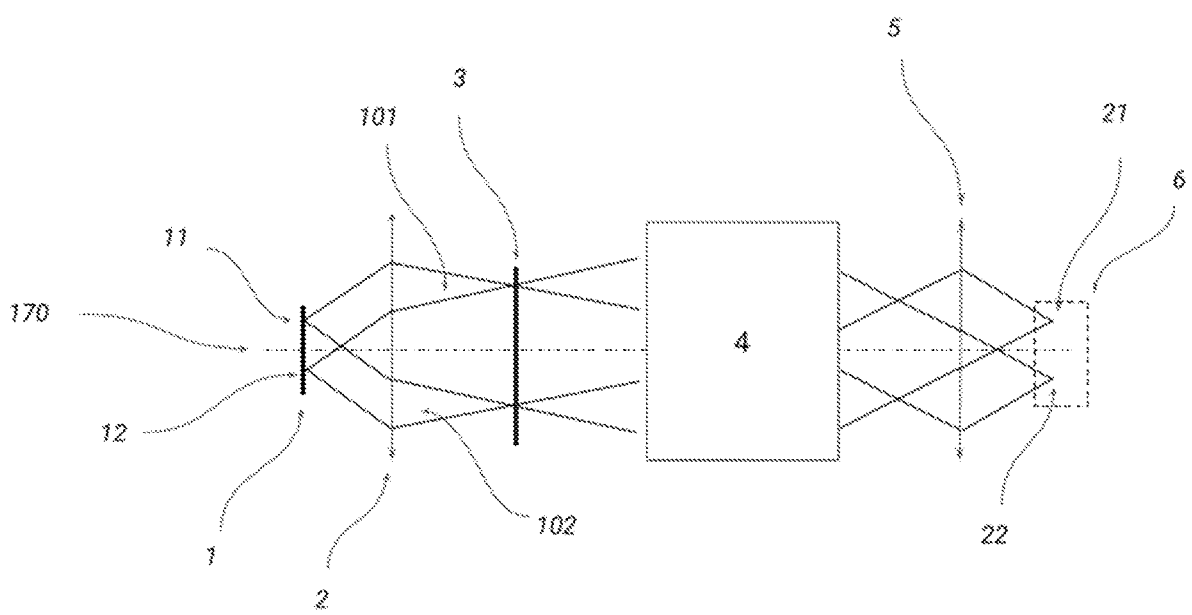
FIG. 1 shows a conventional illumination system.

In contrast with the conventional light-field projector shown in FIG. 1, the collimated light-beams 101, 102 do not directly illuminate the SLM 3 but pass through the waveguide module 30 before illuminating the SLM 3.

Figure 3:
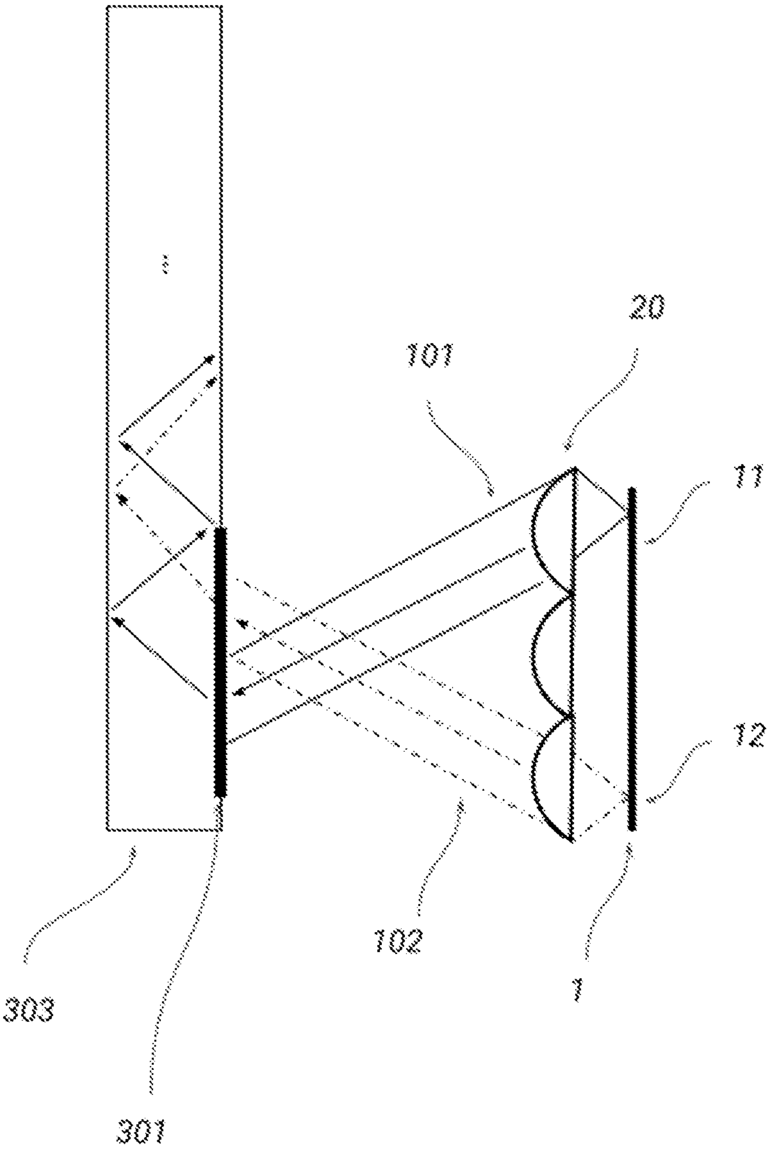
FIG. 3 represents a partial view of the detailed view of the light-field projector of FIG. 2, showing the light device and the waveguide module.

FIG. 3 represents a partial view of the detailed view of the light-field projector of FIG. 2, showing the light device 1 and the waveguide module 30. The light device 1 is shown comprising two distinct light sources 11, 21 where each light source 11, 12 is collimated by a collimating element 20 such as to generate collimated incident light-beams 101, 102 transmitted to the optical waveguide module 30. The collimated incident light-beams 101, 102 are coupled to the waveguide 303 by the input grating 301.

Figure 4:
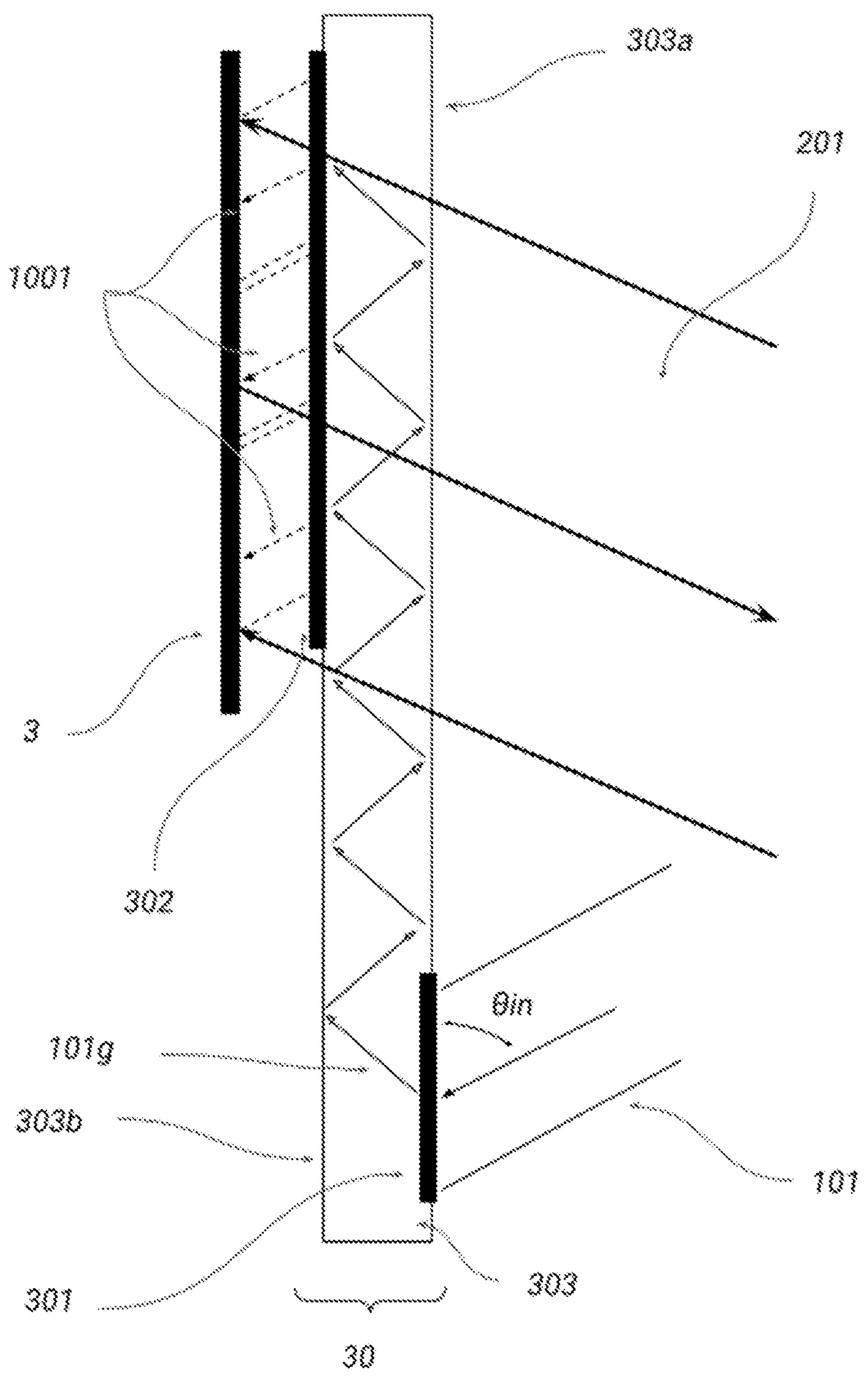
FIG. 4 illustrates schematically an example of the light propagation in the optical waveguide module, according to an embodiment.

FIG. 4 illustrates schematically an example of the light propagation in the optical waveguide module 30. In FIG. 4, a single collimated incident light-beam 101 entering the optical waveguide module 30 is represented, but the example applies to a plurality of collimated incident light-beams 101, 102. The waveguide 303 includes an optically transmissive substrate having a first surface 303*a* and a second surface 303*b*. The input grating 301 formed on or in the first surface 303*a*. The input grating 301 is configured to receive the collimated incident light-beam 101, 102 and to couple the collimated incident light-beam 101, 102 into the waveguide 303 as a guided light-beam 101*g*. The collimated incident light-beam 101, 102 arrives on the input grating 301 with a certain incident angle $\theta_{in}$. The guided light-beam 101*g* propagates by total internal reflection in the waveguide 303 until hitting an exit grating 302 formed on or in the second surface 303*b*. The waveguide 303 is configured to extract the guided light-beam 101*g* incoming at a certain angle with a corresponding efficiency. Indeed, part of the guided light-beam 101*g* exits the waveguide 303 with the incident angle $\theta_{in}$. Part of the guided light-beam 101*g* continues propagating in the waveguide 303 by total internal reflection, encountering again and again the exit grating 302 and outcoupling each time part of the guided light-beam 101*g* having the same incident angle $\theta_{in}$. This type of propagation generates a series of exit sub beamlets 1001 that together form one single expanded light-beam 201.

The expanded light-beam 201 is projected on the SLM 3 at a specific angle given by the orientation of the exit sub beamlets 1001 and is reflected on the SLM 3 and propagates towards the intermediate optics 4 (see FIG. 2). The expanded light-beam 201 carries image information provided by the modulation of the SLM 3.

FIG. 4 illustrates a cross section view of the optical waveguide module 30 and the expanded light-beam 201, i.e., the expanded light-beam 201 is shown in only one dimension. In practice, the expanded light-beam 201 can expand substantially over an entire two dimensional surface of the SLM 3, such that the expanded light-beam 201 must expand in the other dimension. This can be achieved by using an intermediate grating (not shown) between the input grating 301 and the exit grating 302.

The input grating 301 can comprise any standard diffraction grating, including a surface relief grating. Parasitic unmodulated light by the SLM 3 originating from exit sub beamlets 1001 reflected on the exit grating 302 can be minimized by using an exit grating 302 comprising a Bragg grating having substantially null diffraction efficiency for predetermined diffraction orders. In order to avoid that part of the exit sub beamlets 1001 reflecting on the SLM 3 interacts again with the exit grating 302 (which would represent light loss), the SLM 3 can be tilted relative to the waveguide 303. The tilt can be achieved mechanically or can be configured as an optical function of the waveguide 303. In a desired configuration, the input grating 301 can comprise a volume phase holographic grating or a liquid crystal polarization grating.

The uniformity of the expanded light-beam 201, 202 depends on the ratio of the size of the collimated incident light-beam 101, 102 to the thickness of the waveguide 303 (the distance separating the first surface 303*a* and the second surface 303*b*). In a desired aspect, the size of the collimated incident light-beam 101, 102 can be between 0.5 mm and 5 mm, and the thickness of the waveguide 303 can be between 0.2 mm and 3 mm.

Figure 5:
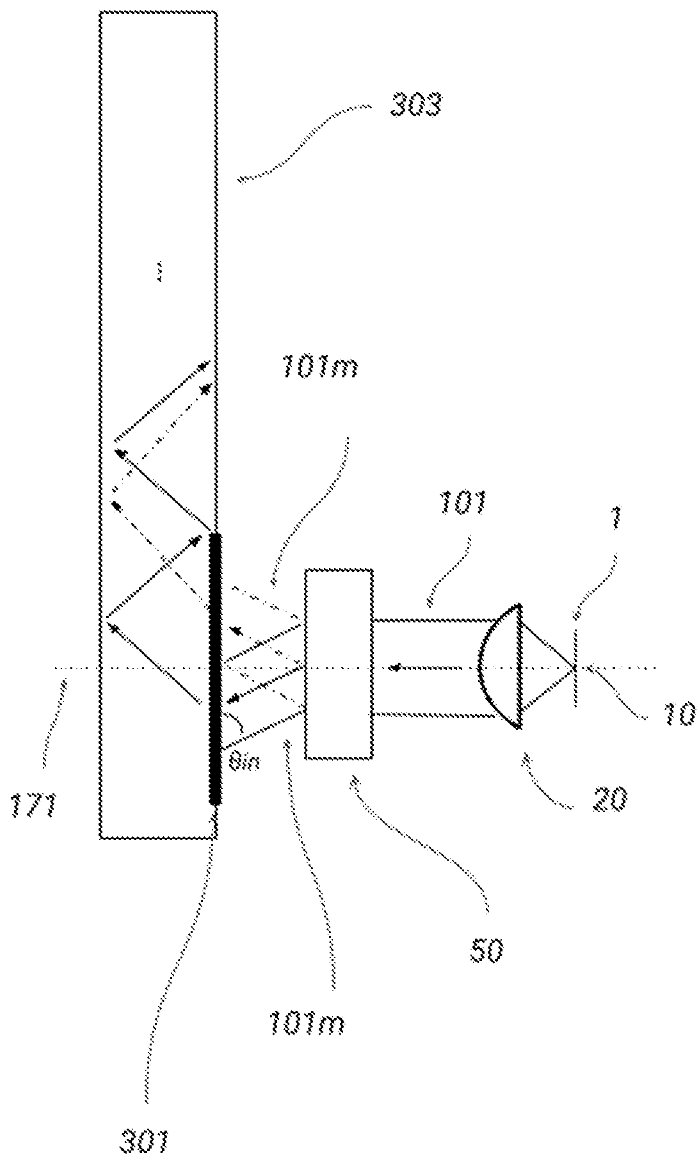
FIG. 5 shows the light-field projector comprising a transmissive optical beam steering unit, according to an embodiment.

FIG. 5 shows the light-field projector according to another embodiment. The light-field projector comprises a multiplexing device 50 configured to time-sequentially vary the incident angle $\theta_{in}$ of the collimated incident light-beam 101. The light device 1 generates the collimated incident light-beam 101 along an incident axis 171. The incident angle $\theta_{in}$ is varied relative to the incident axis 171. The multiplexing device 50 allows for generating, time-sequentially, a plurality of multiplexed light-beams 101*m*, each having a distinct incident angle $\theta_{in}$ relative to the incident axis 171.

In the configuration of FIG. 5, the multiplexing device 50 comprises a transmissive optical beam steering unit 50 arranged between the light device 1 and the waveguide module 30. The transmissive optical beam steering unit 50 can comprise a tunable phase array, a liquid crystal (LC) SLM, a Ferroelectric LC SLM, a polarization switch coupled to a polarization grating, or an acousto-optics modulator.

In a desired configuration, the light device 1 comprises a single light source 10. The light device 1 further comprises a collimating element 20, for example a single lens, to generate a single collimated incident light-beam 101 along the incident axis 171. The multiplexing device 50 time-sequentially varies the incident angle $\theta_{in}$ of the single collimated incident light-beam 101 relative to the incident axis 171 such as to time-sequentially generate a plurality of multiplexed light-beams 101*m*, each multiplexed light-beam 101*m* having a distinct incident angle $\theta_{in}$ relative to the incident axis 171. The multiplexed light-beams 101*m* are coupled into the waveguide 303 by the input grating 301. The time-sequentially generated plurality of multiplexed light-beams 101*m*, each having a distinct incident angle $\theta_{in}$, replaces the plurality of light sources 11, 12 in order to create different viewpoints in the final light field eye-box 6.

Figure 6:
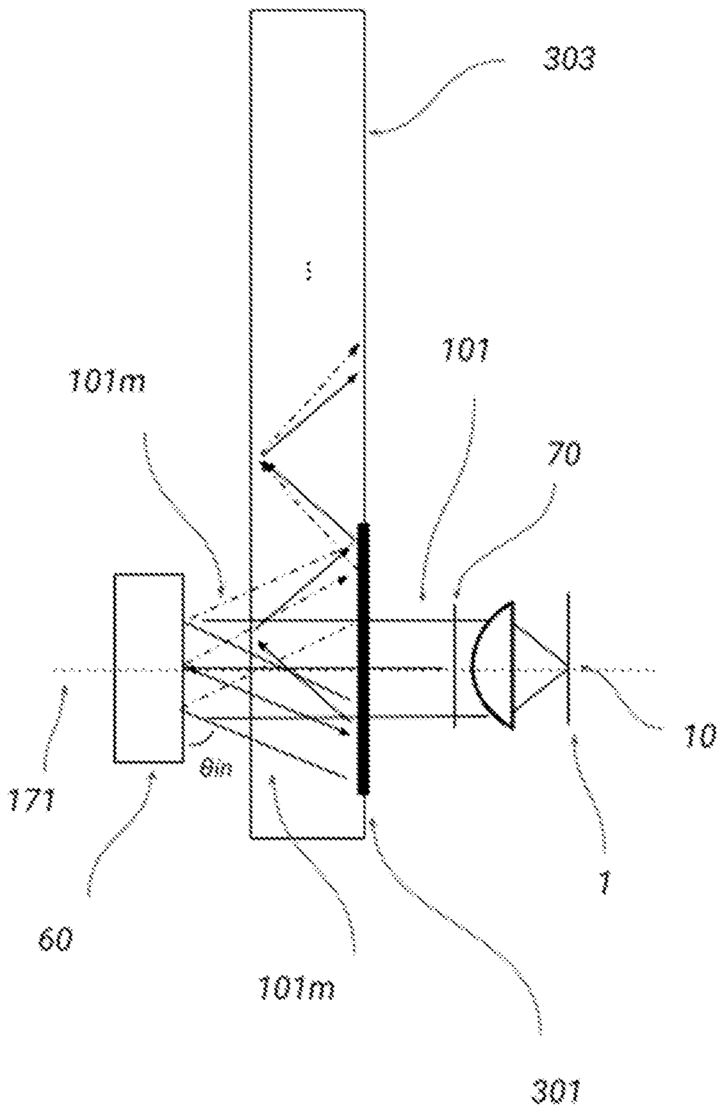
FIG. 6 represents the light-field projector comprising comprises a reflective optical beam steering unit, according to an embodiment.

In another embodiment represented in FIG. 6, where the multiplexing device comprises a reflective optical beam steering unit 60 configured to receive the collimated incident light-beam 101 and time-sequentially reflect the plurality of multiplexed light-beams 101*m*. Again, and as shown in FIG. 6, the light device 1 can comprise a single light source 10, as described above.

In the arrangement illustrated in FIG. 6, the waveguide module 30 is between the reflective optical beam steering unit 60 and the light device 1. In such configuration, the collimated incident light-beam 101 needs to pass through the waveguide 303 and the input grating 301 before reaching the reflective optical beam steering unit 60. When the collimated incident light-beam 101 reaches the reflective optical beam steering unit 60, the latter sequentially reflects a plurality of multiplexed light-beams 101*m*. The multiplexed light-beams 101*m* are then coupled in the waveguide 303 through the input grating 301.

The collimated incident light-beam 101 should not be affected when travelling through the waveguide 303 and the input grating 301. To that end, the light device 1 can comprise a linear polarizer (not shown) configured to linearly polarize the incident light-beam 101. The light-field projector can further comprise a circular polarization device 70 configured to convert the linearly polarized collimated incident light-beam 101 into a circularly polarized collimated incident light-beam 101 (right hand in FIG. 6). In one aspect, the circular polarization device 70 comprises a quarter wave plate.

The circularly polarized collimated incident light-beam 101 can pass through the input grating 301 comprising a Bragg polarization grating. The Bragg polarization grating diffracts only a single polarization (+1st order) and leaves the orthogonal polarization un-diffracted. With a circularly polarized input, the efficiency can reach up to 99%. In the example of FIG. 6, the input grating 301 can reflect other handedness than the right-hand circular polarization.

The reflective optical beam steering unit 60 reflects the collimated incident light-beam 100 that passes through the waveguide 303 and the input grating 301 as multiplexed light-beams 101*m* at different incident angles $\theta_{in}$ relative to the incident axis 171. The handedness of polarization of the multiplexed light-beams 101*m* is reversed. The multiplexed light-beams 101*m*, reflected by the reflective optical beam steering unit 60, are diffracted by the input grating 301 and coupled into the waveguide 303.

Figure 7:
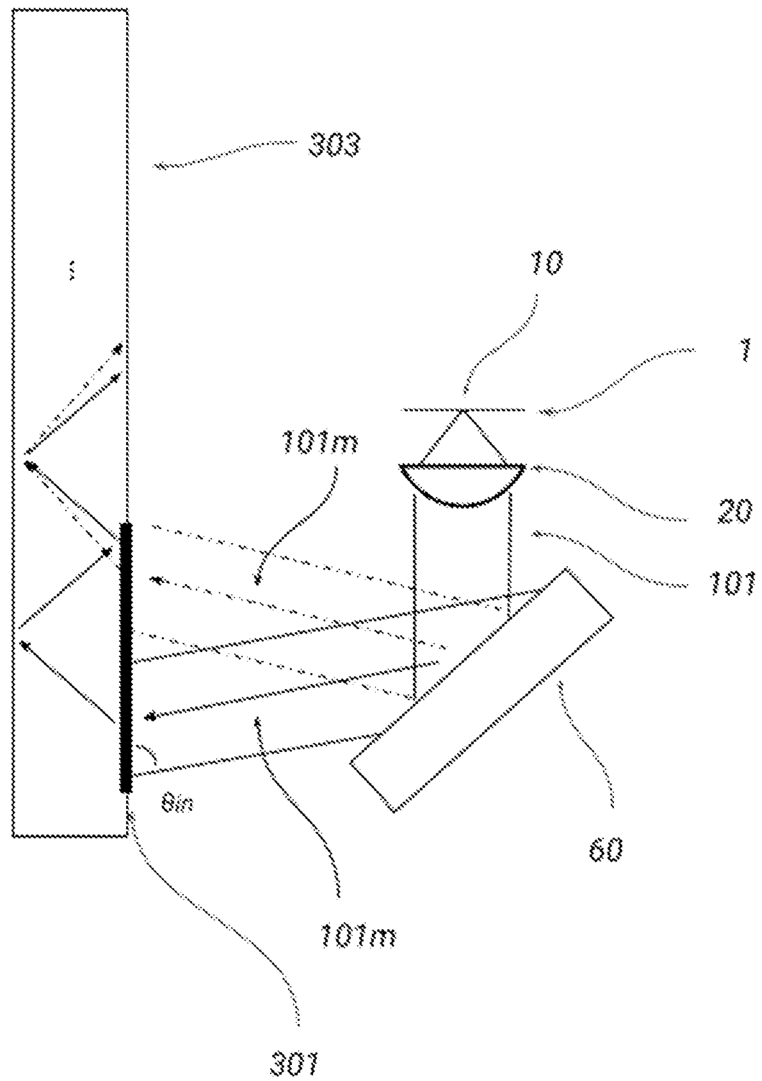
FIG. 7 shows the light-field projector according to a variant of the embodiment represented in FIG. 6.

FIG. 7 shows the light-field projector according to a variant of the embodiment represented in FIG. 6. Here, the reflective optical beam steering unit 60 is between the optical waveguide module 30 and the light device 1. The reflective optical beam steering unit 60 time sequentially scans the collimated incident light-beam 101, generating multiplexed light-beams 101*m* that interact with the input grating 301 and coupled into the waveguide 303.

The multiplexing device 50, 60 can comprise mechanically moving unit such as a 2-axis steering mirror, or a non-mechanically moving unit such as a tunable phase array, a liquid crystal (LC) SLM, a ferroelectric LC SLM, polarization switches coupled to a polarization grating, or an acousto-optics modulator. Other implementations of the mechanically moving or non-mechanically moving multiplexing device 50, 60 adapted for generating, time-sequentially, a plurality of multiplexed light-beams 101*m*, each having a distinct incident angle $\theta_{in}$ relative to the incident axis 171, are also possible.

The time-sequential generation of the plurality of multiplexed light-beams 101*m* is performed for a range of useful incident angles $\theta_{in}$ and steering speeds that depend on the number of viewpoints 21, 22 as well as the size and design of the eye-box 6. In a desirable configuration, the incident angle $\theta_{in}$ can be between +30° to 0° and the steering speed (or steering refresh rate) can be between 30 Hz and 1 kHz or between 30 Hz and 10 kHz.

An input grating 301 comprising a surface relief grating, has nonzero efficiency in the +1 and −1 order. When coupled by the input grating 301 in the +1 order, the collimated incident light-beam 101, 102 may be reflected toward the input grating 301 (toward an area where the surface relief grating is present). This may result in part of the light to couple out (in the −1 order) causing unwanted power loss. The unwanted power loss can be minimized by using an input grating 301 having a small surface area (for example between 0.5 mm and 5 mm), collimated incident light-beams 101, 102 having a small size (for example between 0.5 mm and 5 mm), and a waveguide 30 having a large thickness (for example between 0.6 mm and 6 mm). However, such configuration may result in poor uniformity in the expanded light-beam 201, 202.

In a desired configuration, the input grating 301 comprises a Bragg grating having substantially zero efficiency in the −1 order. Such Bragg grating allows for minimizing power loss and for minimizing the distance between the collimating element 20 and the optical waveguide module 30. Such Bragg grating can include, without limitation, volume phase holographic and polarization liquid crystal Bragg gratings.

The light-field projector can be adapted for multiple wavelengths applications, such as a RGB light-field projector. To that end, each collimated incident light-beam 101, 102 can comprise RGB information. The optical waveguide module 30 can be adapted for the three wavelengths. Alternatively, the light device 1 can comprise three light sources, each light source sequentially generating an incident light-beam 101, 102 having one of the three frequencies. A waveguide can be used to combine the three incident light-beams 101, 102.

Other possible configurations include stacking three RGB waveguides. Here holographic gratings can be advantageously used. By stacking three RGB holographic gratings, multiplex RGB behavior can be multiplexed on a single layer.

Figure 8:
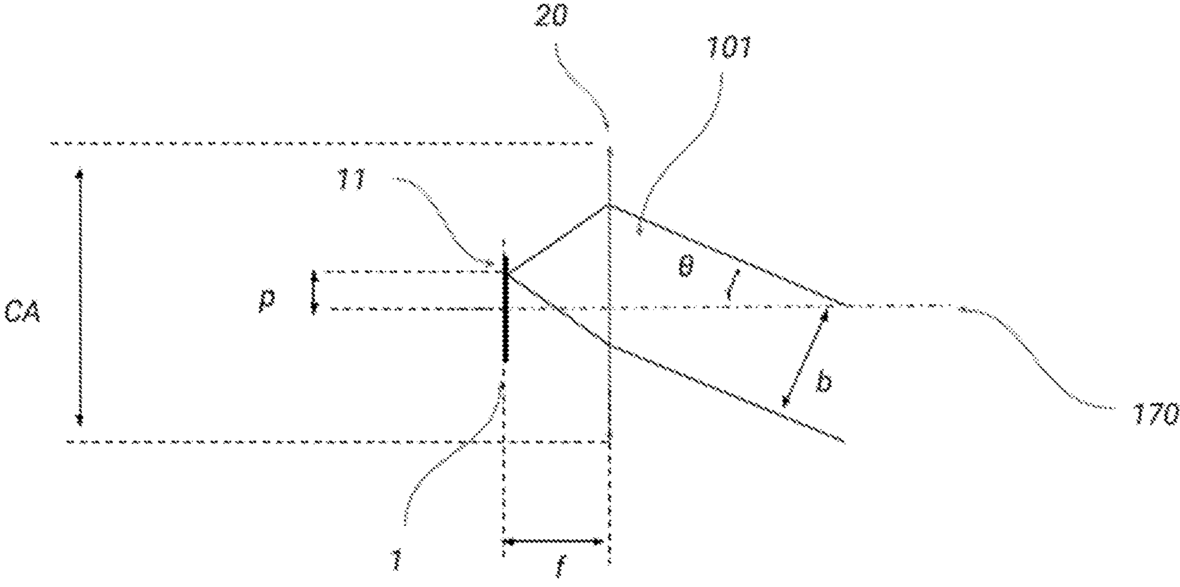
FIG. 8 illustrates schematically the formation of a collimated incident light-beam.

FIG. 8 illustrates schematically the formation of a collimated incident light-beam 101. The light device 1 is shown with a single light source 11. The collimating element 20 is represented by a line perpendicular to the projection axis 170. To create the viewpoints 21, 22 in the eye-box 6, the collimated incident light-beam 101 should have a beam size b that is large enough to cover the surface area of the SLM 3. This condition requires that the collimation element 20 has clear aperture (CA) directly related to its beam size b. In the configurations of FIGS. 5 to 7, the optical waveguide module 30 expands the collimated incident light-beam 101 and generates an expanded light-beam 201. Thus, the optical waveguide module 30 allows a shorter focal length f of the collimation element 20. The size of the collimated incident light beam 101 can thus be smaller while still covering the surface area of the SLM 3. In the case the light device 1 comprises an array comprising a plurality of light sources 11, 12, the distance p between the light sources can be reduced compared to an array used in the absence of the optical waveguide module 30. More generally, the smaller focal length achieved by the expansion of the optical waveguide module 30 allows for using a smaller light device 1 (denser array of light sources or using a single light source 10 in combination with the multiplexing device 50, 60).

As shown by the examples of FIGS. 5 to 7, the small light device generating a small incident light-beam 101 can be easily steered, such that the incident light-beam 101 can be time-sequentially steered such as to generate virtual input light sources. This configuration can advantageously achieve the same result as when using a light device comprising a large array of light sources. The light-field projector disclosed herein can thus have a smaller form factor, lower power consumption, and lower manufacturing complexity and cost.

Other configurations of the light device 1 can be contemplated. In a non-illustrated configuration, the light device 1 can comprise a photonic integrated chip. For example, the photonic integrated chip can comprise one or a plurality of integrated waveguides, each integrated waveguide having an input connected to a light source and an output emitting light point (generating the incident light-beam). The light source or light sources can be remote from the photonic integrated chip and possible in another plane as the one of the photonic integrated chips. The plurality of integrated waveguides may be arranged such that the plurality of output emitting light points forms an array.

The light device 1 comprising a photonic integrated chip allows for obtaining an array of emitting light points that can be denser and have a smaller surface, even for large sized light sources, than an array obtained by arranging the light sources directly in a plane.

In a possible configuration, the light-field projector can comprise a multiplexing device 50, 60, and the light device 1 can comprise a photonic integrated chip provided with one or a plurality of integrated waveguides, each waveguide being inputted by a remote light source. In such a configuration, the multiplexing device 50, 60 can be between the inputs and output emitting light points.

Alternatively, the light device 1 can comprise a PCB surface on which light sources are arranged in an array layout. More generally, the light device 1 can comprise any surface configured to emit one point source (or point light) or an array of point sources (or point light).

REFERENCE NUMBERS AND SYMBOLS

1 light device
10 single light source
11, 12 light source
101, 102 incident light-beam
101*m* multiplexed light-beam
100*g* guided light-beam
170 projection axis
171 incident axis
1001 sub-beamlets
2 illumination optics
20 collimating element
21, 22 viewpoint
201, 202 expanded light-beam
3 spatial light modulator
30 optical waveguide module
301 input grating
302 exit grating
303 waveguide
303*a* first surface
303*b* second surface
4 optical component
5 combiner optics
6 eye-box
50 transmissive optical beam steering unit
60 reflective optical beam steering unit
70 circular polarization device
$\theta_{in}$ incident angle
b beam size
f focal length
p distance between light sources

The invention claimed is:

1. Light-field projector for projecting an image, the light-field projector comprising:

a light device comprising at least one light source, each of said one light source sequentially generating an incident light-beam;

a collimating element configured to collimate each incident light-beam along an incident axis;

an optical light modulator having a modulator surface area and configured to modulate the collimated incident light-beam and to project a modulated light-beam;

an optical waveguide module comprising a waveguide including an input grating configured to couple each collimated incident light-beam to the waveguide, and an exit grating configured to outcouple each collimated incident light-beam from the waveguide and generate a plurality of expanded light-beams; the plurality of expanded light-beams outcoupled for each collimated incident light-beam being arranged to sequentially illuminate substantially the whole modulator surface area;

intermediate optics configured to project the plurality of expanded light-beams modulated by the optical light modulator, along a projection axis, to an eye-box region in an eye-box plane and to re-image the incident light-beam into viewpoints within the eye-box region in the eye-box plane;

wherein the optical waveguide module is between the optical light modulator and the intermediate optics; and wherein the light-field projector further comprises a multiplexing device, configured to time-sequentially vary an incident angle of one collimated incident light-beam relative to the incident axis such as to time sequentially generate a plurality of multiplexed light beams, each having a distinct incident angle relative to the incident axis, the plurality replacing a plurality of light sources in order to create different viewpoints in the light field eye box.

2. Light-field projector according to claim 1, wherein the exit grating comprises a Bragg grating, a volume phase holographic gratings, or a liquid crystal polarization grating.

3. Light-field projector according to claim 1, wherein the light device comprises a single light source and collimating element such as to generate a single collimated incident light-beam along the incident axis.

4. Light-field projector according to claim 1, wherein the multiplexing device comprises a transmissive optical beam steering unit arranged between the light device and the waveguide module.

5. Light-field projector according to claim 4, wherein the transmissive optical beam steering unit comprises a tunable phase array, a liquid crystal (LC) SLM, a Ferroelectric LC SLM, a polarization switch coupled to a polarization grating, or an acousto-optics modulator.

6. Light-field projector according to claim 1, wherein the multiplexing device comprises a reflective optical beam steering unit configured to receive the collimated incident light-beam and time-sequentially reflect the plurality of multiplexed light-beams.

7. Light-field projector according to claim 6, wherein the waveguide is between the reflective optical beam steering unit and the light device; the collimated incident light-beam passing through the waveguide and the input grating before reaching the reflective optical beam steering unit; and wherein the sequentially reflected plurality of multiplexed light-beams is coupled in the waveguide through the input grating.

8. Light-field projector according to claim 6, wherein the reflective optical beam steering unit is between the waveguide and the light device.

9. Light-field projector according to claim 6, wherein the reflective optical beam steering unit comprises a 2-axis steering mirror, a tunable phase array, a liquid crystal (LC) SLM, a ferroelectric LC SLM, polarization switches coupled to a polarization grating, an acousto-optics modulator.

10. Light-field projector according to claim 1, wherein the incident angle is between ±30° and 0°.

11. Light-field projector according to claim 1, wherein a steering speed of the multiplexing device is between 30 Hz and 10 KHz.

12. Light-field projector according to claim 1, wherein the light device comprises a photonic integrated chip including one or a plurality of integrated waveguides, each integrated waveguide having an input connected to a light source and an output generating the incident light-beam.

13. Light-field projector according to claim 12, wherein the multiplexing device is between the input and output emitting light point of each integrated waveguide.

14. Light-field projector for projecting an i mage, the light-field projector comprising:

a light device comprising a single light source sequentially generating an incident light-beam;

a collimating element configured to collimate the incident light-beam along an incident axis;

an optical light modulator having a modulator surface area and configured to modulate the collimated incident light-beam and to project a modulated light-beam;

an optical waveguide module comprising a waveguide including an input grating configured to couple the collimated incident light-beam to the waveguide, and an exit grating configured to outcouple the collimated incident light-beam from the waveguide and generate a plurality of expanded light-beams; the plurality of expanded light-beams being arranged to sequentially illuminate substantially the whole modulator surface area;

intermediate optics configured to project the plurality of expanded light-beams modulated by the optical light modulator, along a projection axis, to an eye-box region in an eye-box plane and to re-image the incident light-beam into viewpoints within the eye-box region in the eye-box plane;

wherein the optical waveguide module is between the optical light modulator and the intermediate optics; and wherein the light-field projector further comprises a multiplexing device, configured to time-sequentially vary an incident angle of the collimated incident light-beam relative to the incident axis such as to time sequentially generate a plurality of multiplexed light beams, each having a distinct incident angle relative to the incident axis, the plurality replacing a plurality of light sources in order to create different viewpoints in the light field eye box.

* * * * *